United States Patent
Trim et al.

(10) Patent No.: US 11,068,065 B2
(45) Date of Patent: Jul. 20, 2021

(54) NON-VERBAL COMMUNICATION TRACKING AND CLASSIFICATION

(71) Applicant: INTERNATIONAL BUSINESS MACHINES CORPORATION, Armonk, NY (US)

(72) Inventors: Craig M. Trim, Ventura, CA (US); Aaron K. Baughman, Silver Spring, MD (US); Michael Bender, Rye Brook, NY (US); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 16/202,323

(22) Filed: Nov. 28, 2018

(65) Prior Publication Data
US 2020/0167002 A1 May 28, 2020

(51) Int. Cl.
| | |
|---|---|
| *G06F 3/01* | (2006.01) |
| *G06K 9/00* | (2006.01) |
| *G06F 9/451* | (2018.01) |
| *G06N 20/00* | (2019.01) |

(52) U.S. Cl.
CPC .............. *G06F 3/017* (2013.01); *G06F 9/451* (2018.02); *G06K 9/00335* (2013.01); *G06N 20/00* (2019.01)

(58) Field of Classification Search
CPC ......... G06F 3/017; G06F 9/451; G06N 20/00; G06K 9/00335
See application file for complete search history.

(56) References Cited

U.S. PATENT DOCUMENTS

| | | | | |
|---|---|---|---|---|
| 7,541,926 | B2* | 6/2009 | Dugan | G08B 21/02 340/572.1 |
| 7,599,527 | B2* | 10/2009 | Shah | G06K 9/03 382/118 |
| 9,211,077 | B2 | 12/2015 | Jung | |
| 9,607,573 | B2 | 3/2017 | Kanevsky et al. | |
| 2003/0127511 | A1* | 7/2003 | Kelly | G07C 9/257 235/380 |
| 2005/0043897 | A1* | 2/2005 | Meyer | G06Q 30/02 702/19 |
| 2008/0215972 | A1* | 9/2008 | Zalewski | A63F 13/35 715/706 |
| 2009/0058862 | A1 | 3/2009 | Finn et al. | |

(Continued)

OTHER PUBLICATIONS

Agarwal, Shantenu; IBM Watson present Soul Machines; LENDIT Conference 2017; https://www.youtube.com/watch?v=khr-eWGhTSI; Mar. 19, 2017; 3 pages.

(Continued)

*Primary Examiner* — Sejoon Ahn
(74) *Attorney, Agent, or Firm* — Schmeiser, Olsen & Watts; Brian M. Restaura

(57) ABSTRACT

A computer-implemented method comprising: sensing, by a personal computing device, a non-verbal communication of a user of the computing device; classifying the non-verbal communication according to at least one attribute of the user; and programming a computer-generated avatar to perform a body movement for an audience viewing the avatar by comparing a determined attribute of the audience and the classified non-verbal communication.

20 Claims, 9 Drawing Sheets

(56) References Cited

U.S. PATENT DOCUMENTS

| | | | |
|---|---|---|---|
| 2009/0138805 A1* | 5/2009 | Hildreth | H04N 21/64322 |
| | | | 715/745 |
| 2009/0254868 A1 | 10/2009 | Bokor et al. | |
| 2010/0083140 A1 | 4/2010 | Dawson et al. | |
| 2010/0153868 A1 | 6/2010 | Allen et al. | |
| 2011/0007142 A1 | 1/2011 | Perez et al. | |
| 2011/0093820 A1* | 4/2011 | Zhang | A63F 13/10 |
| | | | 715/863 |
| 2011/0128288 A1* | 6/2011 | Petrou | G06F 16/434 |
| | | | 345/428 |
| 2011/0298827 A1 | 12/2011 | Perez | |
| 2012/0242800 A1* | 9/2012 | Ionescu | G06F 3/017 |
| | | | 348/46 |
| 2013/0038601 A1 | 2/2013 | Han | |
| 2013/0110952 A1 | 5/2013 | Dawson | |
| 2017/0084070 A1* | 3/2017 | Chamdani | G06T 13/40 |
| 2017/0352178 A1* | 12/2017 | Katz | G02B 27/0093 |

OTHER PUBLICATIONS

Anonymous, "Method and System for Customizing Culture-Based Translation of Nonverbal Communication in Video Conference Systems." IP.com Disclosure No. IPCOM000239192D, Publication Date: Oct. 20, 2014.

Fernando, Isuru "Issy"; The human face of Artificial Intelligence; https://www.ibm.com/blogs/ibm-anz/digital-humans/; Sep. 27, 2017; 9 pages.

* cited by examiner

US 11,068,065 B2

NON-VERBAL COMMUNICATION TRACKING AND CLASSIFICATION

BACKGROUND

The present invention relates generally to the collection and processing of kinesic data, and more specifically to processing data related to non-verbal communications for use in applications where demographic insights and granular attribution are desired.

It is well-known that communication is not limited to speech, and may include non-verbal aspects of human interaction such as body movements, postures, gestures, and/or facial expressions. Computer applications including avatars or related graphical representations may display such non-verbal communication when responding to an utterance directed at the avatar by a person interacting with the avatar. However, a computer may execute a script that instructs the avatar to display a non-verbal cue such as a particular eye contact, hand motion, or facial expression during the interaction. However, some non-verbal communications such as hand gestures are not universal but instead unique to a particular culture or other demographic. Therefore, a viewing audience may misinterpret a particular hand gesture due to the audience's nationality, culture, age, or other demographic association.

SUMMARY

An embodiment of the present invention relates to a computer-implemented method comprising: detecting, by a computing device, a non-verbal communication of a user of the computing device; classifying the non-verbal communication according to at least one attribute of the user; and programming a computer-generated avatar to perform a body movement for an audience viewing the avatar by comparing a determined attribute of the audience and the classified non-verbal communication.

Another embodiment of the present invention relates to a computer-implemented method comprising: detecting, by a personal computing device, a non-verbal communication of a user of the personal computing device; associating the non-verbal communication of the user with the at least one attribute of the user; segmenting kinesic data of the non-verbal communication according to the at least one attribute of the user; and storing the segmented kinesic data for subsequent retrieval for use with another user sharing a same attribute of the at least one attribute as the user.

Another embodiment of the present invention relates to a computer system, comprising: a processor; a memory device coupled to the processor; one or more remote computer servers in communication with the processor; and a computer readable storage device coupled to the processor. The storage device contains program code executable by the processor via the memory device to implement a method comprising: detecting a non-verbal communication of a user of the personal computing device; classifying the non-verbal communication according to at least one attribute of the user; and programming a computer-generated avatar to perform a body movement for an audience viewing the avatar by comparing a determined attribute of the audience and the classified non-verbal communication.

Another embodiment of the present invention relates to a computer program product, comprising a computer readable hardware storage device storing a computer readable program code, the computer readable program code comprising an algorithm that when executed by a computer processor of a computer system implements a method comprising: detecting a non-verbal communication of a user of a personal computing device; classifying the non-verbal communication according to at least one attribute of the user; and programming a computer-generated avatar to perform a body movement for an audience viewing the avatar by comparing a determined attribute of the audience and the classified non-verbal communication.

DETAILED DESCRIPTION

Figure 1:
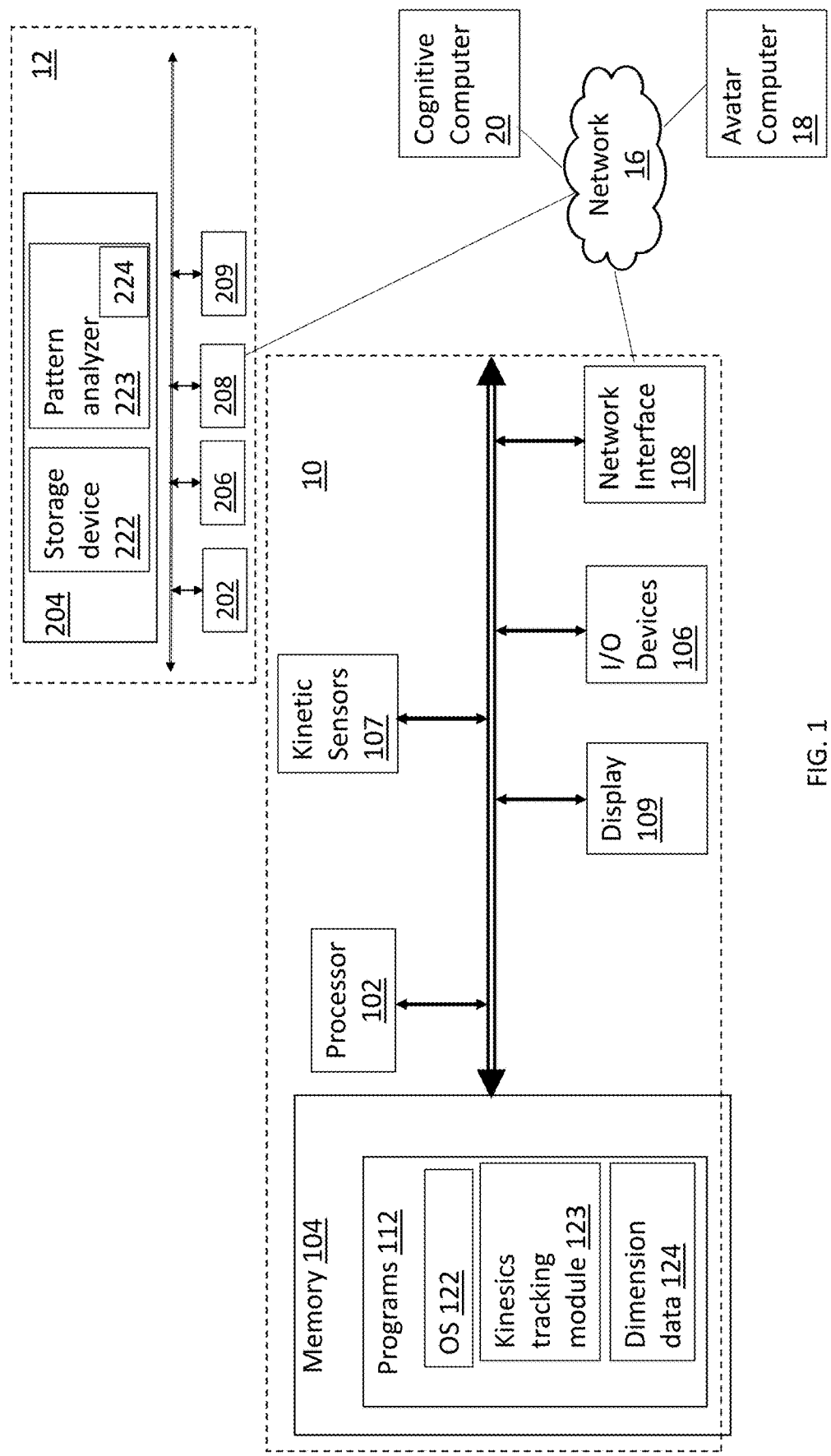
FIG. 1 depicts a computing environment in which embodiments of the present inventive concepts are practiced.

Kinesic behavior, or the way in which certain body movements gestures or the like serve as a form of nonverbal communication, conveys information, but its interpretations may vary by culture or other demographic association. For example, a U.S. resident may recognize a gesture that includes circling the thumb and forefinger while extending the remaining three fingers as "A-OK." However, for residents of other countries, this gesture represents a vulgarity. Therefore, a risk of misinterpretation in intercultural communication situations may exist when an avatar is programmed to display a particular body movement in a universal manner, i.e., regardless of the demographic of the viewing audience with whom the avatar is in communication.

In brief overview, embodiments of the systems and methods of the present inventive concepts are provided that detect, track, classify, categorize, and/or otherwise segment non-verbal communications to correlate the non-verbal and verbal communications of an avatar that considers demographic characteristics of a person or persons interacting with the avatar. Non-verbal communications including kinesics are described herein with respect to body movements, but not limited thereto, and may include any non-verbal communication such as gesture, facial expression, stance, posture, or body language related to a visual-gestural modality. Although avatar-related applications are described herein, embodiments of the systems and methods are not limited thereto. For example, other applications may include the storage of segmented non-verbal communications data for future use. Here, this data may be used by a public speaker who desires to collect feedback on audience queues, body language, and so on when the public speaker emits an utterance.

In some embodiments, the systems and methods learn to communicate to a viewer an appropriate non-verbal communication by using mobile devices to approximate the translation of kinesics through a correlation to existing speech patterns. It is important to note that a vector space of collected and stored kinesic signals can be applied to a ground truth, or baseline or initial interpretation, of reaction. An avatar can be programmed accordingly. However, the system can "learn" over time that particular programmed avatar movements are not appropriate for certain audiences according to determined attributes, more specifically, demographic groups defined by demographic attributes such as age, gender, household income, and the like. In some embodiments, a computative learning loop can track cultural and demographic dynamic generation, and can be reduced to an individual level. For example, a user's mobile device can include one or more sensors for collecting kinesic movement data, for example, a camera, biometric sensor, motion sensor, and so on that detects an individual response to a particular non-verbal communication displayed by an avatar, which can be used as feedback data for establishing whether the non-verbal communication is appropriate for other viewers sharing an attribute with the user.

Accordingly, an avatar can present non-verbal communications in a manner that conveys a maximum positive expressiveness to the given individual or audience communication with the avatar. This is achieved at least in part by a segmentation analysis performed on a gestural movement of one or more body parts commensurate with a particular word, phrase, sentence, or other utterance during a verbal communication. A computer-based segmentation of a user's kinesic movements can be performed at a granular level of attribution, for example, according to demographics, psychographics, affiliation, and so on. For example, a generated result from a kinesics processing computer (e.g., special purpose computer 12 described in FIGS. 1 and 2) can be applied to an avatar (e.g., avatar 21 described in FIG. 2). Accordingly, when the avatar is programmed to "respond with a confirmation gesture" to a question addressed to the avatar by a person, the avatar can display a gesture attenuated to the demographics of the person participating in the communication with the avatar. For example, a Latin American viewer within an age range of 35-50 years old and having a particular medium income can view a gesture presented by the avatar that is conducive to this viewer. Further, in this example, the avatar can be automatically re-programmed if the kinesics processing computer establishes that the gesture presented by the avatar is contrary to an initial understanding by the computer, and is in fact inappropriate.

FIG. 1 depicts a computing environment in which embodiments of the present inventive concepts are practiced. The computing environment may include a personal computing device 10, a kinesics processing computer 12, an avatar computer 18, and a cognitive computer 20 that communicate with each other and/or other computing devices (not shown) via a communication network 16. Examples of a communication network 16 may include, but are not limited to, a public switched telephone network (PSTN), wireless network such as a cellular network for mobile devices, a GPS network, a data communication network, or a combination thereof.

Figure 2:
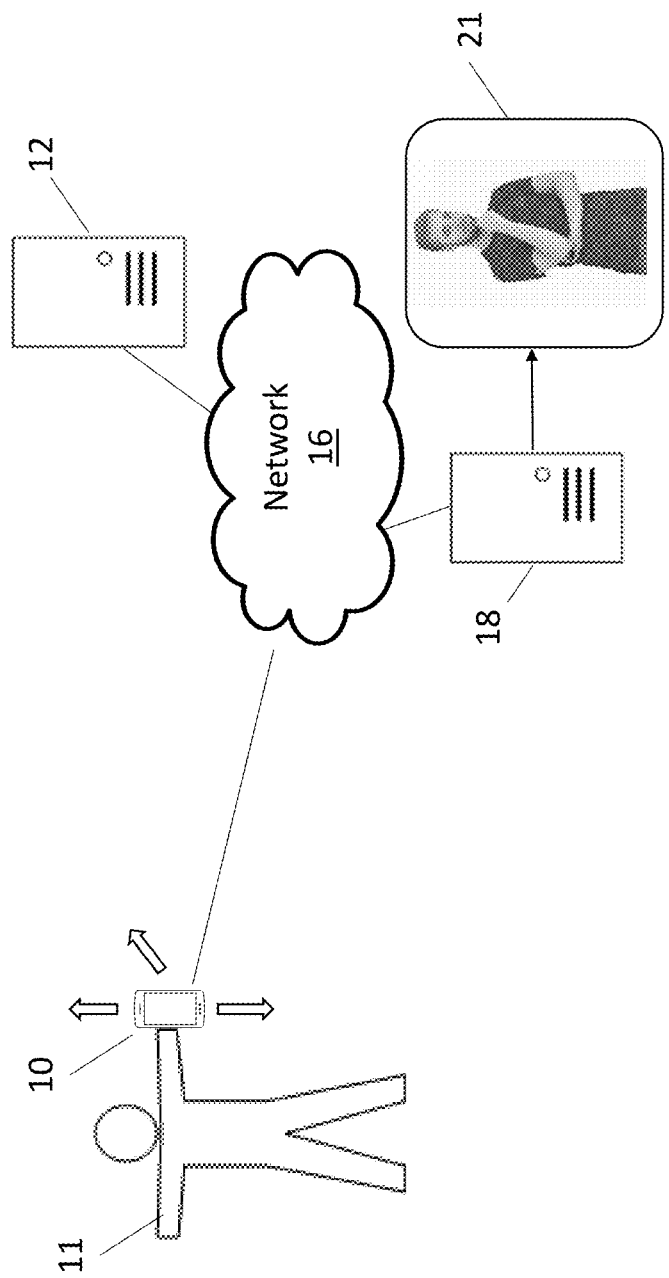
FIG. 2 depicts a simplified block diagram illustrating a data flow exchange between a mobile computing device, a kinesics processing computer, and an avatar computer in accordance with embodiments of the present inventive concepts.

In preferred embodiments, the personal computing device 10 is a mobile computing device such as a smartphone, electronic notebook, or the like that uses wired and wireless technologies to access the network 16 for exchanging kinesic data, personalized avatar data, sensor device data, user demographic or psychographic data, and/or other relevant data with a special-purpose computer 18, referred to as an avatar computer, that stores and executed processes for generating avatars and/or cognitive computer 20, which can receive results from the kinesics processing computer 12 and/or computing device 10 for programming a personalized avatar generated by the avatar computer 18. For example, as shown in FIG. 2, the avatar computer 18 produces an avatar 21 for display. In this example, the avatar 21 can be programmed according to data provided by the cognitive computer 20, personal computing device 10, and/or kinesics processing computer 12 to convey a communication to a viewing audience according to a determined interpretation by the viewing audience of non-verbal communication programmed for the avatar 21. The avatar 21 can recognize or identify the user 11 during a communication exchange by user information collected by the avatar computer 18 via the personal computing device 10 and/or kinesics processing computer 12. For example, user information such as user identification, social network information, biometric data collected in real-time, and so on can be processed and provided to the avatar computer 18 to establish the user's attributes. For example, this information can establish that the user is a Caucasian teenager, and the avatar can be programmed to apply non-verbal communications conducive to this particular type of user. Although an avatar computer 18 is described in accordance with some embodiments, other embodiments may relate to a chatbox or related computer application which conducts a conversation via auditory or textual methods. Although not shown, in other embodiments, the avatar computer 18 and cognitive computer 20 are co-located, i.e., part of a same computer platform, sharing processor and memory resources, and so on.

The computing device 10 includes a processor 102 coupled to a data bus 110. In some embodiments, the data bus 110 includes multiple buses, including but not limited to a system bus, control bus, address bus, I/O bus, and/or other computing bus(es) constructed and arranged to transfer data between various hardware components inside the computing device 10. Also coupled to the data bus 110 may include at least memory device 104, one or more input/output (I/O) devices 106, one or more kinetic sensors 107, a network interface 108, and a display device 109.

A memory device 104 can store programs 112 that are processed by the special-purpose processor 102 of the computing device 10. The processed results can be stored at the memory 104. The memory device 104 can be one or more of a read-only memory (ROM), random access memory (RAM), flash memory, solid state memory, and/or other suitable type of memory.

In addition to storage for processor result data, the memory 104 in some embodiments, stores software programs 112 related to an operating system 122, a kinesics tracking module 123, and a dimension data storage 124. In some embodiments, features described herein with respect to the kinesics processing computer 12 and/or cognitive computer 20 may be part of program code stored at the memory 104 instead of the kinesics processing computer 12 and/or cognitive computer 20. Accordingly, the personal computing device 10 may obviate the need for the kinesics processing computer 12 and/or cognitive computer 20 since it may perform the features of these other computers.

The operating system 122 provides an interface between user commands, for example, entered via an I/O device 106 and the other software programs 112.

The kinesics tracking module 123 can receive data from a sensor 107 for tracking movements of a user of the computing device 10 over a period of time to provide kinesic tracking information. For example, a motion sensor of the computing device can collect data regarding the speed, force, location, or other features of a movement made by a user's arm when holding the computing device 10, which can be processed by the kinesics tracking module 123 so that details of the arm movement can be segmented for further analysis, and stored at the dimension data storage 124. In another example, a camera of the personal computing device 10 may detect an eye movement of the user 11, for example, when the user's eyes widen after the avatar 21 utters a phrase that is insulting to the viewer. This data too may be analyzed so that the avatar 21 does not utter this phrase in the future to a viewer sharing a same demographic as the initial user.

The dimension data storage 124 stores information such as the kinetic tracking information regarding a user's motion from the kinesics tracking module 123. Other dimension data may relate to audio of a user's voice, time-related information regarding an utterance, biometric data such as a user's heartrate collected by a sensor 107, and so on. In some embodiments, the dimension data storage 124 may be stored at a computer remote from the personal computing device 10, for example, a different database.

The kinesics processing computer 12 can include similar components as the computer device 10. For example, kinesics processing computer 12 may include a processor 202, I/O devices 206, network interface 208, and display 209 similar to those of the computer device 10. In addition, a memory 204 may include a storage device 222 and a pattern analyzer 223.

The storage device 222 is constructed and arranged to accommodate a dataset requiring n-dimensional storage, for example, a higher order tensor such as a four-rank tensors.

In some embodiments, the storage device 222 stores "learned data", for example, features that are learned and extracted from utterances spoken by a person that can be used to associate a non-verbal communication with a verbal communication for a particular demographic. Related stored data may include a translation of kinesic movements correlated with existing speech patterns.

The pattern analyzer 223 processes a dataset that includes multi-dimension data such as a detected motion, facial images, biometric data, audio, utterance time and duration, demographics, and related attribution data to identify patterns, or more specifically, a correlation between variables in the dataset. The pattern analyzer 223 can execute a statistical technique such as principal component analysis (PCA) or the like to identify patterns in the data. The results of the pattern analyzer 223 can be used to project relevant information into a smaller dimensional subspace for representing the dataset, which in turn may be applied to the programming of an avatar that conveys a maximum positive expressiveness to a target individual or audience.

In some embodiments, the pattern analyzer 223 includes a correlation processor 224 configured to detect correlations between variable data of the multi-dimension dataset, in particular, movement data, audio data associated with the movement data during a time period, and demographics of a user associated with the movement data. In some embodiments, the correlation processor 224 identifies a maximum variance between variable data. For example, a strong correlation may exist between data in the linear acceleration and rotation vector columns in one dimension and a certain utterance in another dimension. By determining the features of maximum variance in a high-dimensional space represented by the dataset, the correlation processor can project the relevant information into a smaller dimensional subspace.

Figure 3:
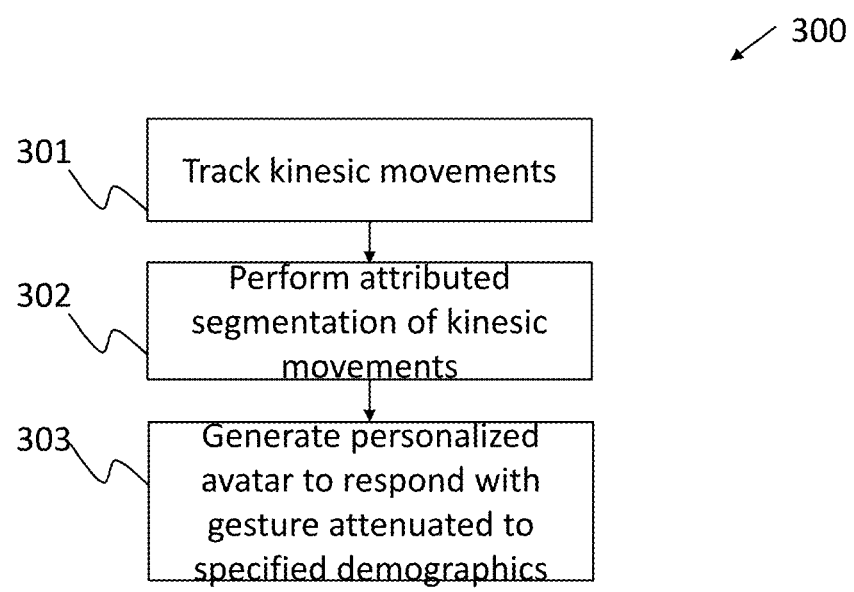
FIG. 3 depicts a flowchart of a computer-implemented method for personalizing an avatar, in accordance with embodiments of the present inventive concepts.

FIG. 3 shows a flowchart of a computer-implemented method 300 for personalizing an avatar, in accordance with some embodiments of the present inventive concepts. In describing the method 300, reference is made to FIGS. 1 and 2.

At block 301, a personal computing device 10 tracks non-verbal communication made by a user 11 of the computing device 10 by activating sensors 107 or the like. In some embodiments, the user's non-verbal communications are tracked in response to an utterance and/or non-verbal communication presented to the user 11 by a computer avatar. In other embodiments, the user's non-verbal communications are tracked in response to an utterance and/or non-verbal communication presented to the user 11 by a human speaker. The tracked data may be stored at a computer memory for subsequent use by a computer program which generates an avatar 21 providing acceptable non-verbal communications for the user.

One source of tracking data may include the mobile computing device 10, which may include sensors 107 such as but not limited to an accelerometer, magnetic element, gyroscope, step counter, compass, camera, biometric device, and/or sensors for detecting one or more of light, gravity, linear acceleration, rotation vectors, orientation, and/or other features associated with a non-verbal communication of a user of the computing device 10.

Another source of tracking data may include audio that is collected by the mobile computing device 10 during a time period commensurate with the time period during which the kinesic data. For example, the sensors 107 above may collect data of a user 11 waving his arms while at the same time audio is collected of the man screaming or generating loud utterances.

Another source of tracking data may include demographic data, psychographic data, or other attribution regarding the user 11, for example, information regarding gender, age, cultural background, ethnicity, and so on.

In addition to non-verbal communication tracking, the sensors 107 or the like may be used to identify the user 11 as part of a particular demographic. For example, a camera on the user's smartphone may capture an image of the user's face. The image data can be output to the kinesics processing computer 12 and/or cognitive computer 20, which in turn can apply analytics or other cognitive learning tool to establish the user's age, race, nationality, sex, and/or other demographic identification. This information may be used to program an avatar to communicate with a user 11 by displaying movements in connection with utterances made by the avatar that are determined to be appropriate for the demographic identification of the user 11.

In some embodiments, a vectorization technique, algorithm, or the like is applied to the non-verbal communication data collected by the personal computing device 10. In some embodiments, a dimensionality reduction algorithm that provides a principal component analysis (PCA) or the like is executed by a pattern analyzer 223 to project the data into a low-dimensional space that includes the transformation of the multi-dimensional data into vectors, which in turn can be applied to artificial simulation, for example, executed by the cognitive computer 20. Pattern recognition and computer-generated avatars require processing a large amount of multi-dimensional data, such as image and video data. Accordingly, a dimensionality reduction algorithm such as PCA or the like may be applied to project the data into a low-dimensional space and construct new features by analyzing the statistical relationships hidden in the dataset, and identifying maximum variances between variable data of the dataset.

At block 302, a computer-based segmentation of a user's kinesic movements is performed from the tracked demographic and behavioral data. In some embodiments, a segmentation analysis performed on a gestural movement of one or more body parts commensurate with a particular word, phrase, sentence, or other utterance during a verbal communication.

In some embodiments, segmentation by speech inter-onset intervals in the audio domain is performed used to bound the gestures in the visual-kinesic domain. For each segment of a body part trajectory, values are generated that characterize the position of the body party in relationship with a portion of audio, i.e., speech, collected during a period of time. For example, with respect to hand motion, for each segment of the hand trajectory, a computation is performed by the kinesics processing computer 12 that best fits the data, for example, position and velocity of a user's hand.

In some embodiments, non-verbal emotion tracking is classified by automatically extracting features and classifying cross-modal gestures by a simultaneous or near-simultaneous characterization of speech and visual-kinesic data. Feature extraction permits the collected data to be reduced to a smaller dimensional space. Data classification includes a computer-generated process of identifying and labelling statistically significant densities of the attributes. For example, statistically significant attribute associations can be determined for attribution-based segmentation processes described herein.

In some embodiments, associating each kinesic movement based on demographics and the like includes detecting correlations between variable data of the multi-dimension dataset, in particular, movement data, audio data associated with the movement data during a time period, and demographics of a user associated with the movement data. The computer processor-intensive requirements for executing the dimensions of a large-dimension dataset can be reduced by reducing the dimensions, which increases computational efficiency, while also retaining relevant data that permits the system to subsequently query a computer-generated model for gestures that are most relevant for a given attribution (such as an age demographic) for a given utterance.

At block 303, a personalized avatar is generated, or modified, to respond with gesture attenuated to specified demographics. An algorithm for characterizing the information in the feature space of the cross-modal data can be applied so that the results of block 302 are presented to the avatar computer 18 for input to a script or the like for programming an avatar.

In some embodiments, non-verbal tracking and classification operations described herein require user permission, for example, which can be entered via a user interface at the user's personal computing device 10 and subsequently processed by the kinesics processing computer 12. Here, the user's permission can be enabled by an opt-in/opt-out feature, for example, a checked status, consent tab, and so on, which can be executed at the user interface or via other instruction recognized and executed by a computer in communication with the kinesics processing computer 12. An opt-in can activate the system to permit an avatar to perform gestures according to method 300. An opt-out feature, on the other hand, can inactivate or otherwise prevent such operations.

Figure 4:
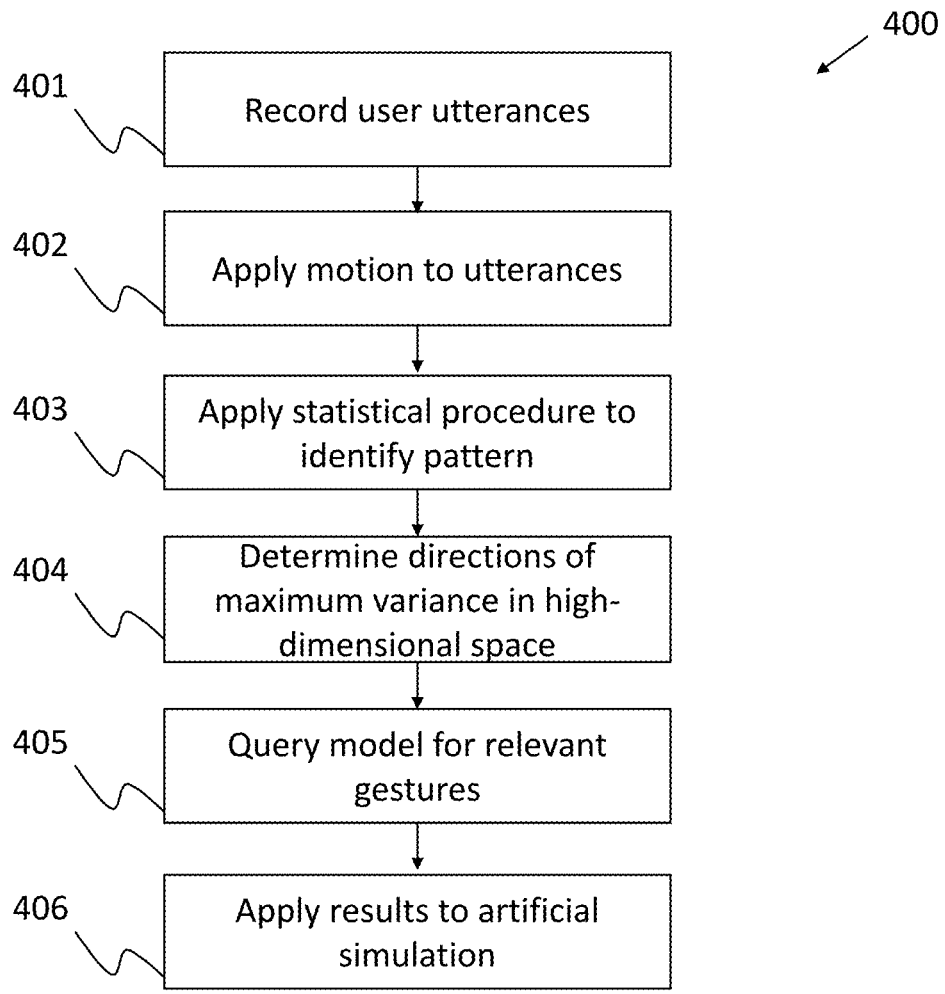
FIG. 4 depicts a flowchart of a computer-implemented method for programming an avatar to simulate a movement that is relevant to a user communicating with the avatar, in accordance with embodiments of the present inventive concepts.

FIG. 4 shows a flowchart of a computer-implemented method 400 for programming an avatar to simulate a movement that is relevant to a user communicating with the avatar, in accordance with some embodiments. In describing the method 400, reference is made to FIGS. 1-3.

At block 401, a user speaks into a microphone of his or her personal computing device 10. For example, the user utters the sentence "you need to understand me" that is captured by a microphone or other sensor of the user's computing device 10. This captured audio can be output from the mobile device 10 to the kinesics processing computer 12 for storage at the storage device 202 and further processing.

At block 402, the user's motion is captured by at least one kinesic sensor 107 of the user's computing device 10. Referring to the example in block 401, the user may extend both hands with palms facing upward, then the hands are moved up and down three times in a rapid and aggressive motion as the user utters the sentence "you need to understand me." Here, the motion of the hands corresponds to utterances contained within the phrase as follows: First shake or up and down motion of hands occurs as the user utters "you need . . . ", the second shake or up and down motion occurs as the user utters " . . . to understand . . . ", and the third shake or up and down motion of the hands occurs as the user utters " . . . me". Other examples of collected data are provided in the description of block 301 of FIG. 3. This data is captured by the user's computing device 10, and output to the kinesics processing computer 12 can process the data, for example, for storage at the storage device 202 for future use, or for use by the avatar computer 20 for programming an avatar 21. Examples of a multi-dimensional data are provided as follows:

A first dimension can represent data collected at block 402 from kinesic sensors 107 or the like of the computing device 10. Such data may include values corresponding to magnetic, gravity, linear acceleration, rotation vectors, orientation, and/or other signals gathered during the user's motion. This first dimension data collected by features of the user's computing device 10 are based on the capabilities of the computing device 10 for performing a motion-based analysis on relevant regions of the user's body, such as the speaker's face and/or hands.

A second dimension can represent features that are learned and extracted from an utterance, such as a phrase spoken by a person.

A third dimension of a tensor matrix may represent time. For example, a speech utterance may be drawn out for a period of several seconds, or longer. The first and third dimensions represent space, i.e., data collected by the personal computing device 10, and time, i.e., duration of the utterance. The second dimension is the occupation of space and time by the uttered phrase.

The fourth dimension represents an attribution of the speaker, for example, demographics, psychographics, cultural attributes, and the like of the user 11.

At block 403, a statistical procedure is executed by the kinesics processing computer 12 to identify patterns in the multi-dimension dataset. In some embodiments, the statistical procedure includes principal component analysis (PCA) or the like that converts variable data of the dataset into a set of values of linearly uncorrelated variables in order to identify patterns. At block 404, the correlation processor 224 and pattern analyzer 223 operate together to determine directions of maximum variance in the multi-dimensional space represented by the dataset to projected the relevant results into a smaller dimensional subspace. Within this subspace we can query the model for gestures that are most relevant for a given attribution (such as an age demographic) for a given utterance.

As described above, certain dimensions represents data that is not learned, for example, mobile device features of the first dimension, while other dimensions such as the second dimensions represents features that are learned and extracted from a phrase spoken by a person.

Figure 5:
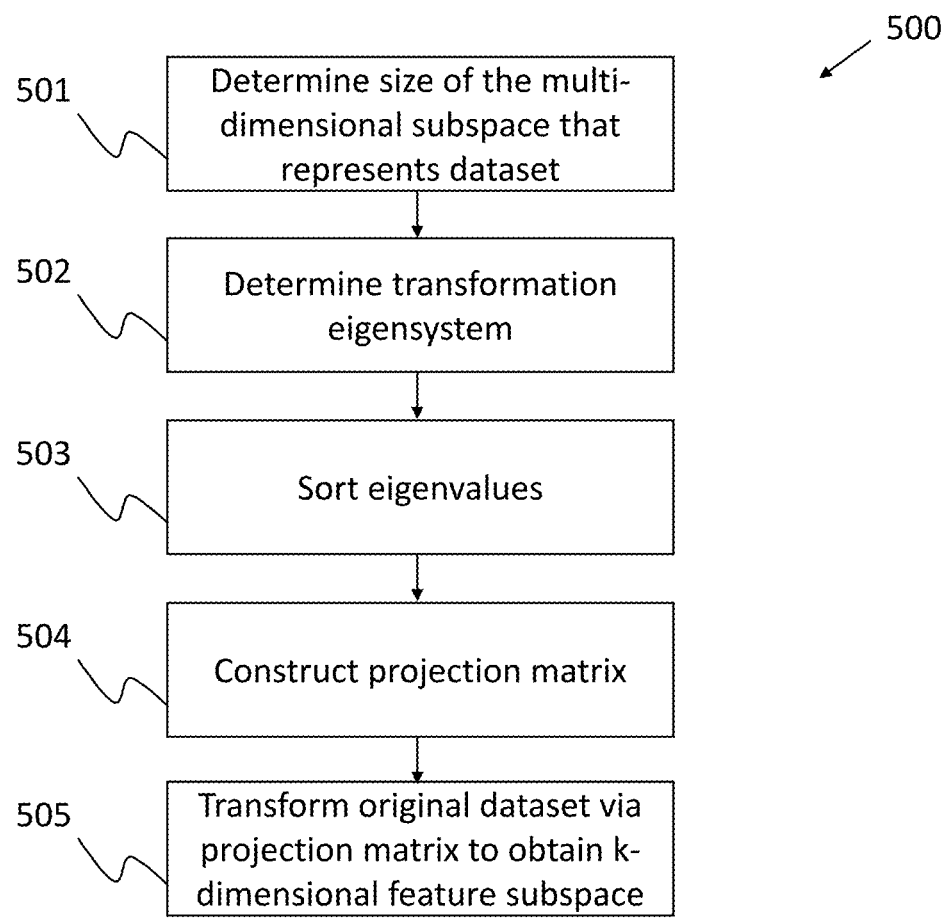
FIG. 5 depicts a flowchart of a method for determining relevant gestures for a given utterance, in accordance with embodiments of the present inventive concepts.

FIG. 5 shows a flowchart of a method 500 for determining relevant gestures for a given utterance, in accordance with some embodiments. In describing the method 500, reference is made to FIGS. 1-3. Some or all of the method 500 may be performed by the pattern analyzer 223 of FIG. 1. In some embodiments, the method 500 is executed for determining a subspace for querying a model for gestures that are most relevant for a given attribution, such as an age demographic, for a given utterance. It is assumed that the variables in the dataset are of a disparate size and scale. Features of a different scale typically provide for a slow and inadequate convergence of data. The method 500 executes and applies a standardization function on a dimension-by-dimension basis, and across all dimensions, for example, to scale the data.

At block 501, a size of a k-dimensional subspace is determined that adequately represents the dataset, wherein k<n, and wherein n refers to a number of dimensions in an n-dimensional dataset. In some embodiments, the dimensions of the n-dimensional dataset are reduced to the k-dimensional dataset by projecting it onto a k dimensional subspace. This can increase the computational efficiency and effectiveness of the dataset while retaining the information of primary importance.

At block 502, eigenvalues and eigenvectors or associated subspaces are obtained from an underlying covariance matrix produced in connection with a PCA. Each of the obtained eigenvectors is associated with an eigenvalue which can be interpreted as a magnitude of the corresponding eigenvector. Some eigenvalues may have a significantly larger magnitude than others. Here, the dataset can be reduced to a smaller dimensional subspace by removing eigenpairs having a smaller magnitude.

Along these lines, at block 503, the eigenvalues are arranged in a predetermined manner, for example, sorted in descending order. In some embodiments, the system selects the k eigenvectors that correspond to the k largest eigenvalues where k is the number of dimensions of the new feature subspace (k<d).

At block 504, a projection matrix is constructed from the selected k eigenvectors, for example, by determining a projection of the data onto the kth principal component. Accordingly, a signal can be reconstructed using those components from the signal subspace.

At block 505, the system transforms the original dataset via the projection matrix to obtain a k-dimensional feature subspace.

Accordingly, the covariance between any two features can be calculated by the kinesics processing computer 12. In some embodiments, a covariance value that corresponds to a covariance between any two features above is calculated according to the following equation:

$$\sigma_{jk} = \frac{1}{n-1} \sum_{i=1}^{N} (x_{ij} - \bar{x}_j)(x_{ik} - \bar{x}_k).$$

Where k<n, and i and j are integers.

Figure 6:
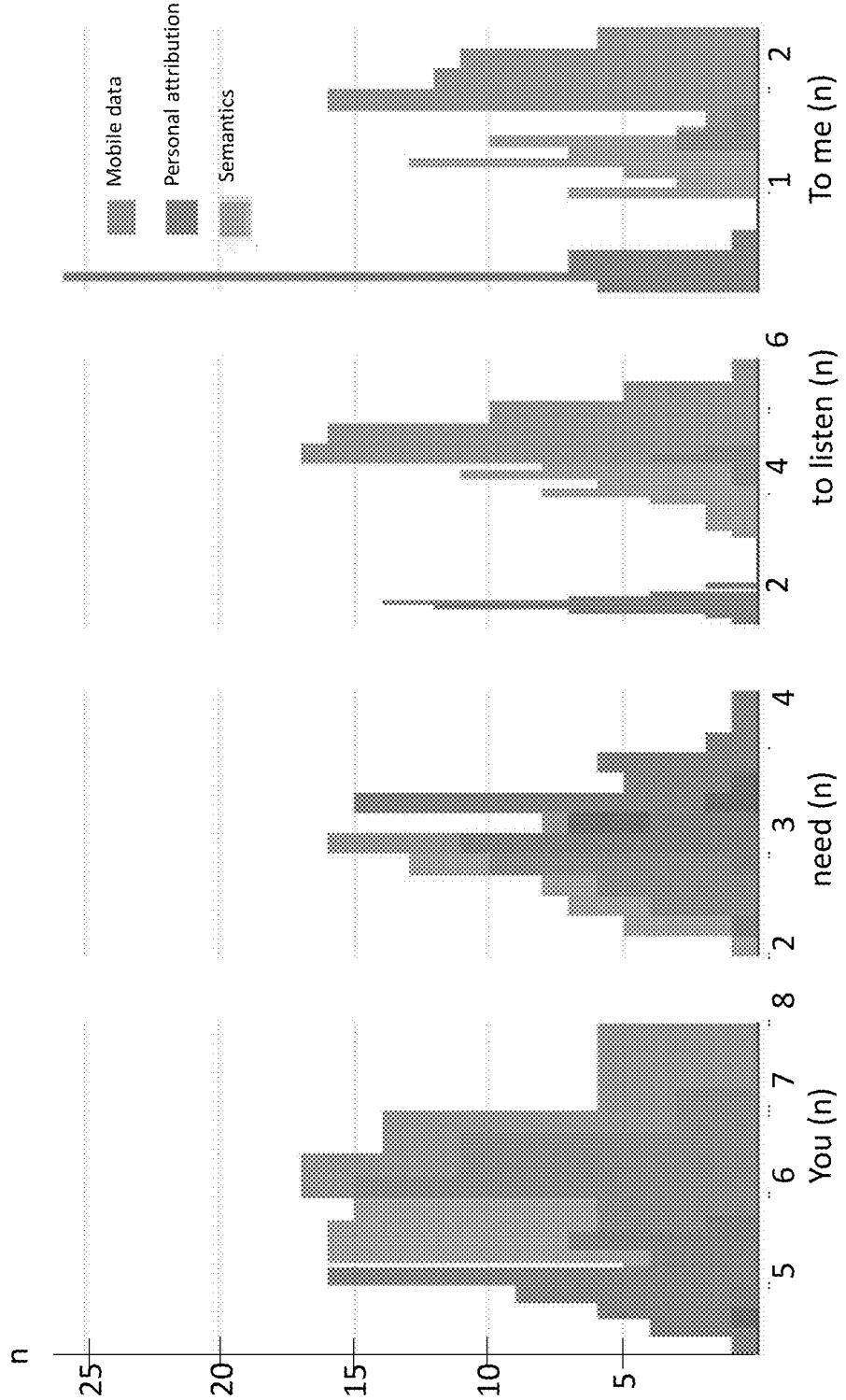
FIG. 6 depicts a distribution of kinesics features determined from a collected dataset, in accordance with embodiments of the present inventive concepts.

The results can be output to the artificial simulation computer 20 for correlation to a known audience. For example, as shown in FIG. 6, a sentence, clause, phrase, or other utterance is arranged by the system, e.g., tokenized, into sections or parts, and associates attributions to the processed and stored utterance. In FIG. 6, histograms can be treated as a single combined histogram illustrating how much emphasis and data the system is receiving for each constituent part. The histograms can be color-coded to illustrate a further breakdown of which sources are contributing this data, for example, providing visual feedback to a viewer where the system is using the data for analysis and/or learning from.

Figure 7:
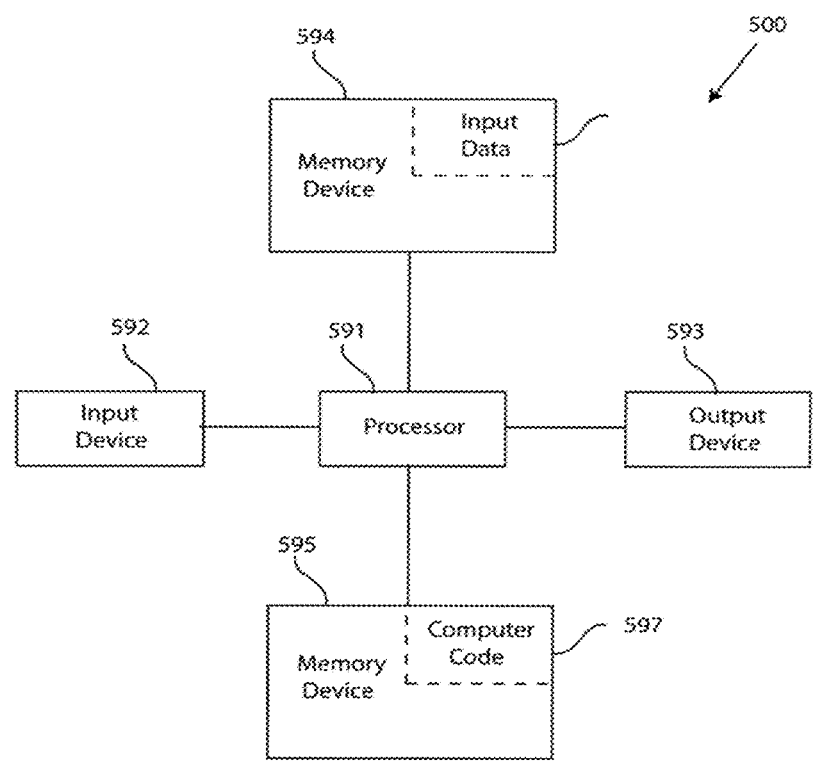
FIG. 7 depicts a block diagram of a computer system capable of implementing a method for conveying electronic messages according a representation of a non-verbal communication, in accordance with embodiments of the present inventive concepts.

FIG. 7 illustrates a block diagram of a computer system 500 that may be included in the system of FIGS. 1 and 2, in particular, the computing system 10, kinesics processing computer 12, avatar computer 18, and/or cognitive computer 20, and execute one or more methods illustrated in FIGS. 3-5 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing embodiments of a method, in the manner prescribed by one or more elements of the system and methods described with respect to FIGS. 1-6, wherein the instructions of the computer code 597 may be executed by processor 591 via memory device 595. The computer code 597 may include software or program instructions that may implement one or more algorithms for implementing the methods of providing a result, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN) 16 shown in FIG. 2. Further, memory devices 594, 595 may include an operating system (not shown) and may include other systems not shown in the Figures.

In some embodiments, the computer system 500 may further be coupled to an input/output (I/O) interface and a computer data storage unit. An I/O interface may include any system for exchanging information to or from an input device 592 or output device 593. The input device 592 may be, inter alia, a keyboard, a mouse, etc. or in some embodiments the sensors 110. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository, for example, part of one or more elements of the computing architecture as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to cognitive computer systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of personalizing a computer-generated avatar, programming a computer-generated avatar to simulate a movement that is relevant to a user communicating with the avatar, a method for determining relevant gestures for a given utterance, and/or non-verbal emotion tracking, classifying body language used for personalizing a computer-generated avatar according to non-verbal communications of an audience having a particular demographic characteristic, and so on. Thus, the present inventive concepts disclose a process for supporting, deploying and/or integrating computer infrastructure, integrating, hosting, maintaining, and deploying computer-readable code into the computer system 500, wherein the code in combination with the computer system 500 is capable of performing the methods according to embodiments of the present inventive concepts.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
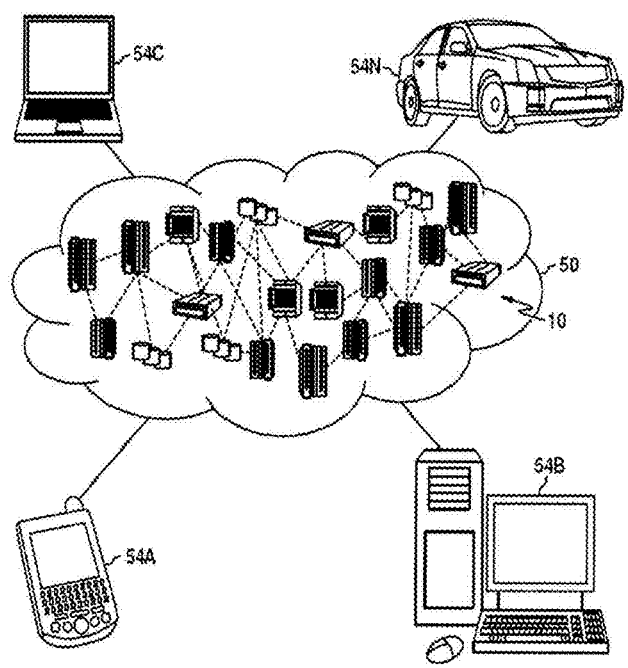
FIG. 8 depicts a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 8 are intended to be illustrative only and that computing nodes 10 and cloud computing environment 50 can communicate with any type of computerized device over any type of network and/or network addressable connection (e.g., using a web browser).

Figure 9:
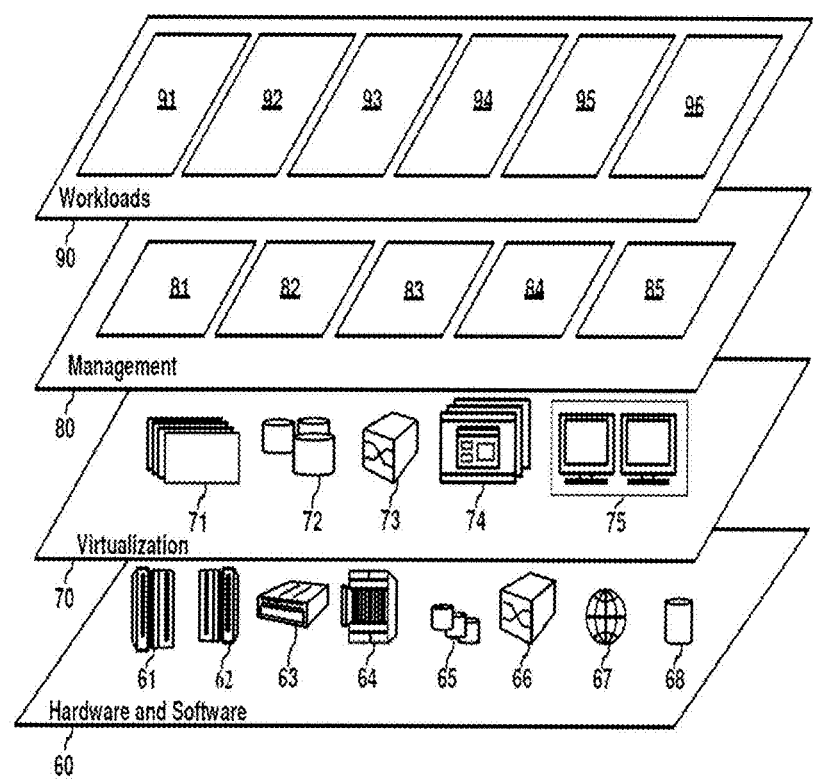
FIG. 9 depicts abstraction model layers, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API management or the like 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, by a personal computing device, a non-verbal communication of a user of the personal computing device;
   classifying the non-verbal communication according to at least one attribute of the user; and
   programming a computer-generated avatar to perform a body movement for an audience viewing the avatar by comparing a determined attribute of the audience and the classified non-verbal communication.

2. The computer-implemented method of claim 1, further comprising
   processing demographic and psychographic data of the user to determine the at least one attribute of the user; and
   applying a learning program to perform the body movement by the avatar uniquely for the audience by associating the non-verbal communication of the user with the at least one attribute of the user and applying the association to the audience when the determined attribute of the audience is the same or similar as the at least one attribute of the user.

3. The computer-implemented method of claim 1, further comprising:
   tracking a plurality of kinesic movements of the non-verbal communication executing a vectorization program, including:
      receiving and processing data of the kinesic movement in response to the detection by the personal computing device; and
      receiving and processing audio from the user of the during a time period commensurate with collecting the kinesic data.

4. The computer-implemented method of claim 3, wherein the collected data is generated by at least one of an accelerometer, a magnetic device, a gyroscope, a proximity sensor, a light sensor, a gravity sensor, a linear acceleration sensor, a rotation vector sensor, a step counter, an orientation sensor, and a compass of the personal computing device.

5. The computer-implemented method of claim 1, wherein classifying the non-verbal communication according to at least one attribute of the user comprises:
   detecting correlations between variable data comprising a combination of movement data, audio data associated with the movement data during a time period, and demographics of a user associated with the movement data; and
   identifying maximum variances between each variable data.

6. The computer-implemented method of claim 5, further comprising:
   identifying kinesic movements from a stored listing of kinesic movements that are relevant for a variable of the variable data.

7. The computer-implemented method of claim 6, wherein the variable of the variable data includes an utterance of the audio data.

8. The computer-implemented method of claim 1, wherein the at least one attribute of the user defines a demographic group of the user.

9. The computer-implemented method of claim 1, wherein programming the avatar to perform the body movement for the audience further comprises:
   determining from a sensor of the personal computing device of the audience the attribute of the audience;
   determining that the audience attribute is the same as the at least one attribute of the user; and
   retrieving data regarding the body movement associated with the user.

10. A computer-implemented method comprising:
    detecting, by a personal computing device, a non-verbal communication of a user of the personal computing device;
    associating the non-verbal communication of the user with the at least one attribute of the user;
    segmenting kinesic data of the non-verbal communication according to the at least one attribute of the user; and
    storing the segmented kinesic data for subsequent retrieval for use with another user sharing a same attribute of the at least one attribute as the user.

11. The computer-implemented method of claim 10, further comprising processing demographic and psychographic data of the user of the personal computing device to determine the at least one attribute of the user; and
    processing the segmented kinesic data to program a computer-generated avatar to perform a body movement.

12. The computer-implemented method of claim 10, further comprising:
    tracking a plurality of kinesic movements of the non-verbal communication executing a vectorization program, including:
       receiving and processing data of the kinesic movement in response to the detection by the personal computing device; and
       receiving and processing audio from the user of the personal computing device during a time period commensurate with collecting the kinesic data.

13. The computer-implemented method of claim 10, wherein segmenting kinesic data of the non-verbal communication comprises:
    detecting correlations between variable data comprising a combination of movement data, audio data associated with the movement data during a time period, and demographics of a user associated with the movement data; and
    identifying maximum variances between each variable data.

14. The computer-implemented method of claim 13, further comprising:
    identifying kinesic movements from a stored listing of kinesic movements that are relevant for a variable of the variable data.

15. The computer-implemented method of claim 14, wherein the variable of the variable data includes an utterance of the audio data.

16. The computer-implemented method of claim 10, further comprising:
    programming with the stored segmented kinesic data a computer-generated avatar to perform a body movement for an audience.

17. The computer-implemented method of claim 16, wherein the avatar to perform a body movement for an audience comprises:

determining from a sensor of the personal computing device of the audience the attribute of the audience;

determining that the audience attribute is the same as the at least one attribute of the user; and retrieving data regarding the body movement associated with the user.

18. A computer program product, comprising a computer readable hardware storage device storing a computer readable program code, the computer readable program code comprising an algorithm that when executed by a computer processor of a computer system implements a method comprising:

detecting a non-verbal communication of a user of a personal computing device;

classifying the non-verbal communication according to at least one attribute of the user; and programming a computer-generated avatar to perform a body movement for an audience viewing the avatar by comparing a determined attribute of the audience and the classified non-verbal communication.

19. The computer program product of claim 18, further comprising:

tracking a plurality of kinesic movements of the non-verbal communication executing a vectorization program, including:

receiving and processing data of the kinesic movement in response to the detection by the personal computing device; and receiving and processing audio from the user of the during a time period commensurate with collecting the kinesic data.

20. The computer program product of claim 18, wherein classifying the non-verbal communication according to at least one attribute of the user comprises:

detecting correlations between variable data comprising a combination of movement data, audio data associated with the movement data during a time period, and demographics of a user associated with the movement data; and identifying maximum variances between each variable data.

* * * * *